United States Patent
Zhu et al.

(10) Patent No.: US 11,900,584 B1
(45) Date of Patent: Feb. 13, 2024

(54) METHOD FOR JUDGING FRESHNESS OF CULTURED FISH PRODUCT BASED ON EYE IMAGE RECOGNITION

(71) Applicant: SHANDONG UNIVERSITY OF TECHNOLOGY, Shandong (CN)

(72) Inventors: Lanlan Zhu, Shandong (CN); Xudong Wu, Shandong (CN); Xiuting Wei, Shandong (CN); Qingxiang Zhang, Shandong (CN); Hengjia Ni, Shandong (CN); Ruining Kang, Shandong (CN); Lei Liu, Shandong (CN)

(73) Assignee: SHANDONG UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 18/459,385

(22) Filed: Aug. 31, 2023

(30) Foreign Application Priority Data

Nov. 21, 2022 (CN) .......................... 202211451493.1

(51) Int. Cl.
*G06T 7/00* (2017.01)
*G06T 7/11* (2017.01)
(Continued)

(52) U.S. Cl.
CPC .............. *G06T 7/0004* (2013.01); *G06T 7/11* (2017.01); *G06T 7/12* (2017.01); *G06T 7/136* (2017.01);
(Continued)

(58) Field of Classification Search
CPC . G06T 7/0004; G06T 7/11; G06T 7/12; G06T 7/136; G06T 2207/30128; G06V 20/68; G06V 40/18
See application file for complete search history.

(56) References Cited

U.S. PATENT DOCUMENTS 9,488,631 B2 * 11/2016 Wakita ............... G01N 21/4738
9,541,496 B2 * 1/2017 Wakita ................ G08B 21/182
(Continued)

FOREIGN PATENT DOCUMENTS

CN 202133619 U 2/2012
CN 104880412 A 9/2015
(Continued)

OTHER PUBLICATIONS

Gu et al., "A New Detection Method for Fish Freshness", 2014 Seventh International Symposium on Computational Intelligence and Design, pp. 555-558 (Year: 2014).*
(Continued)

*Primary Examiner* — Nay A Maung
*Assistant Examiner* — Jose M Torres
(74) *Attorney, Agent, or Firm* — Rachel Pilloff; Sean Passino; Martin Cosenza

(57) ABSTRACT

A method for judging freshness of cultured fish product based on eye image recognition is provided, which relates to the field of image processing and includes the following steps: obtaining eye area and eye center point of each cultured fish product; obtaining a first data category and a second data category of each gray scale change sequence according to each gray scale change sequence of each eye area; calculating a first mean value and a second mean value of each gray scale change sequence; obtaining the fish eye turbidity of each eye area according to the first mean value and the second mean value; obtaining the fish eye plumpness of each eye area according to the first data category and the second data category; and obtaining the freshness of each cultured fish product according to the fish eye turbidity and fish eye plumpness in each eye area.

5 Claims, 1 Drawing Sheet

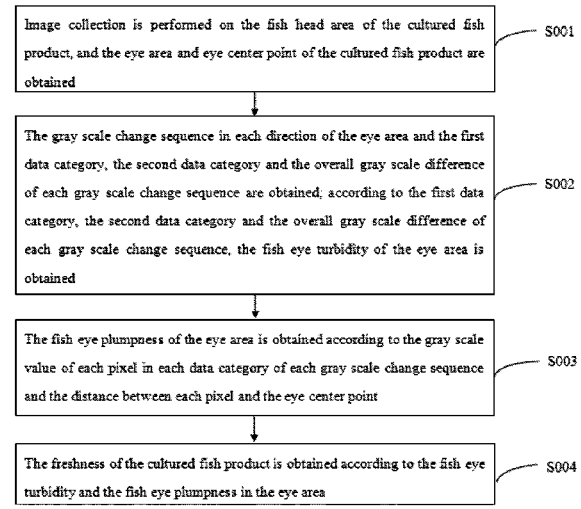

(51) Int. Cl.
  *G06T 7/136* (2017.01)
  *G06V 40/18* (2022.01)
  *G06V 20/68* (2022.01)
  *G06T 7/12* (2017.01)

(52) U.S. Cl.
  CPC .............. *G06V 20/68* (2022.01); *G06V 40/18* (2022.01); *G06T 2207/30128* (2013.01)

(56) References Cited

U.S. PATENT DOCUMENTS

2015/0247807 A1* 9/2015 Wakita ................... G01N 21/84
                                              250/372
2021/0140887 A1   5/2021 Akiyama et al.

FOREIGN PATENT DOCUMENTS

| CN | 107392117 A | 11/2017 |
| CN | 111768401 A | 10/2020 |
| CN | 112852406 A | 5/2021 |
| EP | 2189789 A1 | 5/2010 |

OTHER PUBLICATIONS

First Office action for China Application No. 202211451493.1, dated Dec. 30, 2022.
Zhao Lichang et al., "Fusion of Infrared and Visible Images Based on Gray Energy Difference," Infrared Technology, Aug. 2020, vol. 42, No. 8.
Zhou Xiao et al., "Iris Recognition Based on Regional Grayscale Change," Opto-Electronic Engineering, Oct. 2010, vol. 37, No. 10.
Huang Lijuan et al., "Research progress on evaluation methods for freshness of raw meat," Meat Research, Jun. 2007.
Huang Xing-Yi et al., "Study on detection method for fish freshness based on computer vision," Computer Engineering and Design, Oct. 2013, vol. 34, No. 10.
First Search Report for China Application No. 202211451493.1, dated Dec. 27, 2022.
Supplemental Search Report for China Application No. 202211451493.1, dated Jan. 4, 2023.
Notice to Grant for China Application No. 202211451493.1, dated Jan. 18, 2023.

* cited by examiner

| Image collection is performed on the fish head area of the cultured fish product, and the eye area and eye center point of the cultured fish product are obtained | ~ S001 |

↓

| The gray scale change sequence in each direction of the eye area and the first data category, the second data category and the overall gray scale difference of each gray scale change sequence are obtained; according to the first data category, the second data category and the overall gray scale difference of each gray scale change sequence, the fish eye turbidity of the eye area is obtained | ~ S002 |

↓

| The fish eye plumpness of the eye area is obtained according to the gray scale value of each pixel in each data category of each gray scale change sequence and the distance between each pixel and the eye center point | ~ S003 |

↓

| The freshness of the cultured fish product is obtained according to the fish eye turbidity and the fish eye plumpness in the eye area | ~ S004 | ns
METHOD FOR JUDGING FRESHNESS OF CULTURED FISH PRODUCT BASED ON EYE IMAGE RECOGNITION

CROSS-REFERENCE TO RELATED APPLICATIONS

This application claims priority to Chinese Patent Application No. 202211451493.1, filed on Nov. 21, 2022, the contents of which are hereby incorporated by reference.

TECHNICAL FIELD

The disclosure relates to the field of image processing, and in particular to a method for judging freshness of cultured fish product based on eye image recognition.

BACKGROUND

The freshness of cultured fish products has always been an important index for people to judge the quality of products. Because live fish are perishable and difficult to store, in order to prolong the storage time of the cultured fish products, the cultured fish products are often frozen during storage and transportation. However, it is difficult to judge the freshness of the frozen cultured fish products because the freshness of the cultured fish tends to decline when it is caught, and it needs to go through many links such as transportation and slaughter. The freshness of cultured fish products, whether directly selected by consumers or secondary processed by merchants, needs to be judged to ensure food safety.

After the death of the cultured fish, fish eyes, fish gills and fish body surface will change to varying degrees. However, because there are many types of cultured fish, the surface of fish itself is quite different, and fish gills are located in the body of cultured fish, so fish eyes may reflect the freshness of the cultured fish more conveniently and intuitively than fish gills and fish surface. Therefore, it is very important to design a method to detect the freshness of the cultured fish products according to the characteristics of fish eye images.

However, due to the differences in the freshness of cultured fish products, the eyeballs of the fresh fish are plump and corneas are transparent and clear. The eyeballs of the secondary fresh fish are not plump, the corneas are wrinkled, slightly turbid, and sometimes the eyes are red and bloodshot. The eyeballs of the stale fish are collapsed or shriveled, and the corneas are wrinkled. On the image, the eyes of the secondary fresh cultured fish are turbid, and the eyeball area and iris area of the fresh cultured fish and the stale cultured fish are clear. Therefore, the conventional threshold segmentation technology and edge detection method may not be directly used to accurately judge the freshness of the cultured fish product, and the detection effect is poor.

SUMMARY

The disclosure provides a method for judging freshness of cultured fish product based on eye image recognition, so as to solve the existing problems.

The method for judging freshness of cultured fish product based on eye image recognition adopts the following technical scheme.

An embodiment of the disclosure provides a method for judging freshness of cultured fish product based on eye image recognition, including following steps:

obtaining an eye area and an eye center point of the cultured fish product according to a fish head area of the cultured fish product;

obtaining each gray scale change sequence of the eye area according to coordinates of each pixel in each direction of the eye area and a gray scale value of the each pixel; obtaining a first data category and a second data category of the each gray scale change sequence according to the gray scale value of the each pixel in the each gray scale change sequence; recording an average gray scale value of the each pixel in the first data category as a first mean value, and recording an average gray scale value of the each pixel in the second data category as a second mean value; taking a difference value between the second mean value and the first mean value of the each gray scale change sequence as an overall gray scale difference of the each gray scale change sequence; obtaining a fish eye turbidity of the eye area according to the first data category, the second data category and the overall gray scale difference of the each gray scale change sequence;

obtaining a gray scale difference of the each pixel in the first data category according to the gray scale value of the each pixel and the first mean value in the first data category of the each gray scale change sequence; obtaining a first non-plumpness of the eye area according to a distance from the each pixel in the first data category to the eye center point and the gray scale difference of the each pixel; obtaining a second non-plumpness of the eye area according to the second data category of the each gray scale change sequence; obtaining a fish eye plumpness of the eye area according to the first non-plumpness and the second non-plumpness of the eye area; and obtaining the freshness of the cultured fish product according to the fish eye turbidity and the fish eye plumpness in the eye area.

Optionally, a method for obtaining the first data category and the second data category of the each gray scale change sequence is:

obtaining a segmentation threshold of the each gray scale change sequence, and recording a maximum distance from the each pixel with the gray scale value smaller than the segmentation threshold in the each gray scale change sequence to the eye center point as a boundary distance; dividing the pixel with a distance from the eye center point less than or equal to the boundary distance in the each gray scale change sequence into the first data category; dividing the pixel with the distance from the eye center point greater than the boundary distance into the second data category; and sequentially processing the each pixel in the each gray scale change sequence to obtain the first data category and the second data category of the each gray scale change sequence.

Optionally, a method for obtaining the fish eye turbidity in the eye area is:

$$Z = \frac{1}{n}\sum_{i=1}^{n}\sum_{j=1}^{2}\exp(-\Delta H_i) \times (H_{ij} - \overline{H}_j)^2$$

where Z is the fish eye turbidity in the eye area; n represents a number of the gray scale change sequence in the eye area; $H_{ij}$ represents a j-th mean value in an i-th direction in the eye area; $\overline{H}_j$ represents an average value of the j-th mean value corresponding in the each direction in the eye area, and exp ( ) is an exponential function with a natural constant as a base number.

Optionally, a method for obtaining the gray scale difference of the each pixel in the first data category is:

taking an absolute value of a difference value between the gray scale value of the each pixel in the first data category of the each gray scale change sequence and the first mean value of the each gray scale change sequence as the gray scale difference of the each pixel in the first data category.

Optionally, a method for obtaining the first non-plumpness of the eye area is:

taking a ratio between the distance from the each pixel in the first data category to the eye center point of the each gray scale change sequence and the boundary distance of the each gray scale change sequence as a reference weight of the each pixel; weighting and summing the gray scale difference of the each pixel in the first data category, and taking an obtained result as the first non-plumpness of the each gray scale change sequence; and taking a cumulative sum of the first non-plumpness of the each gray scale change sequence in the eye area as the first non-plumpness in the eye area.

Optionally, a method for obtaining the freshness of the cultured fish product is:

$$X=\exp(-Z)lg(\delta \times G)$$

where, X is the freshness of the cultured fish product, δ is a super parameter, Z is the fish eye turbidity in the eye area of the cultured fish product, G is the fish eye plumpness in the eye area of the cultured fish product; and lg( ) is a logarithmic function with 10 as a base.

The embodiment has the following advantages.

First, the image of the fish head area of each cultured fish product is collected, so as to extract the eye area of each cultured fish product. Then, the gray scale change sequence in each direction in the eye area is obtained, and the data categories are divided according to the gray scale value of each pixel in each gray scale change sequence, so as to obtain the eyeball area and the iris area; according to the gray scale difference between the two areas and the overall gray scale difference between the two areas, the fish eye turbidity of each eye area is obtained to distinguish secondary fresh cultured fish products from fresh and stale cultured fish products. According to the distance between each pixel in each eye area and the eye center point, and the difference between the gray scale value of each pixel relative to the average gray scale value of the data category to which the pixel belongs, the fish eye plumpness in the eye area is obtained, so as to further distinguish the fresh cultured fish product from the stale cultured fish product. According to the different characteristics of the cultured fish products with different freshness, the cultured fish products with different freshness grades are distinguished, and the freshness of the cultured fish products with the same freshness grade is further distinguished, so that the accuracy of judging the freshness of the cultured fish products is improved, which is simple and rapid.

BRIEF DESCRIPTION OF THE DRAWING

In order to more clearly explain the embodiments of the present disclosure or the technical scheme in the prior art, the FIGURE needed to be used in the description of the embodiments or the prior art will be briefly introduced below. Obviously, the FIGURE in the following description are only some embodiments of the present disclosure, and other FIGURES may be obtained according to these FIGURES without creative work for ordinary people in the field.

The FIGURE is the step flow chart of the method for judging freshness of cultured fish product based on eye image recognition of the present disclosure.

DETAILED DESCRIPTION OF THE EMBODIMENTS

In order to further illustrate the technical means and efficacy adopted by the present disclosure to achieve the objectives of disclosure, the following detailed description is given of the specific implementation, structure, characteristics and efficacy of the method for judging freshness of cultured fish product based on eye image recognition according to the present disclosure, with reference to the attached FIGURE and preferred embodiments. In the following description, different "one embodiment" or "another embodiment" do not necessarily refer to the same embodiment. Furthermore, specific features, structures or characteristics in one or more embodiments may be combined in any suitable form.

Unless otherwise defined, all technical and scientific terms used herein have the same meaning as commonly understood by those skilled in the technical field of the present disclosure.

In the following, the specific scheme of the method for judging freshness of cultured fish product based on eye image recognition provided by the disclosure will be explained in detail with the attached FIGURE.

Please refer to the attached FIGURE, which shows the step flow chart of the method for judging freshness of cultured fish product based on eye image recognition provided by one embodiment of the disclosure, and the method includes the following steps.

S001: image collection is performed on the fish head area of the cultured fish product, and the eye area and eye center point of the cultured fish product are obtained.

The types of the cultured fish include black carp, bighead, grass carp, silver carp, common carp, crucian carp. After the death of cultured fish, due to the different types of the cultured fish, the colors of fish eyes, fish gills and fish body surface are quite different, so it is difficult to judge the freshness of different types of cultured fish product according to the fish body surface image. The eye area of the cultured fish is also located on the fish body surface, and the fish eyes of different types of cultured fish have high similarity. Therefore, the freshness of the cultured fish product may be judged more simply and intuitively according to the eye images of the cultured fish. Therefore, the disclosure needs to extract the eye area of the cultured fish product and judge the freshness of the cultured fish product according to the characteristic information of the eye area. Freshness grades of the cultured fish may be roughly divided into three types: fresh, secondary fresh and stale. The eyeballs of the fresh fish are plump and corneas are transparent and clear. The eyeballs of the secondary fresh fish are not plump, the corneas are wrinkled, slightly turbid, and sometimes the eyes are red and bloodshot. The eyeballs of the stale fish are collapsed or shriveled, and the corneas are wrinkled.

The eye area of fish is a spherical lens, which is mainly divided into two parts: eyeball area and iris area. Because the eye area of the cultured fish is an approximate circular area, and the eyeball is also a circular area, so Hough circle detection may be used to extract the eye area. Hough circle detection is essentially a process of transforming a circle in two-dimensional image space into a point in three-dimensional parameter space, and the point is determined by the radius of the circle, the abscissa of the center and the ordinate of the center. A point passing through the two-dimensional space has countless circles, corresponding to countless points in the three-dimensional space. When many points are in the same circle in the two-dimensional space, the points corresponding to the circle in the three-dimensional parameter space will accumulate in the three-dimensional parameter space at this time, thus forming highlighting points. Hough circle detection is a well-known technology and will not repeat here.

Under normal circumstances, the gray scale value of the eyeball area of the cultured fish is lower than other areas of the eye, such as iris area, and the edge of the eyeball area is clear. However, when the fish is stale, the iris area of the cultured fish will become turbid, which will lead to the decrease of the gray scale difference between the eyeball area and the iris area, and the edge of the eyeball area will be blurred, which may make it difficult to extract the eyeball area by Hough circle detection. However, the whole eye area of the cultured fish is fixed, that is, the eye area may be detected to a certain extent, and the number of edge points in the eye area is greater than that in the eye area, and the cumulative value of the circle corresponding to the eye area in the three-dimensional parameter space is higher. Therefore, after detecting the Hough circle, the point with the largest cumulative value in the three-dimensional parameter space is the circle corresponding to the eye area.

Therefore, the camera and the LED fill light are arranged right above the cultured fish product, and the camera is used to collect the images of the fish head area of the cultured fish product, and the images of the fish head area are grayed to obtain the gray scale image of the fish head area, and then the edge detection of the obtained gray scale image is carried out by using Canny operator to obtain each edge point in the gray scale image. Then Hough circle detection is performed on these edge points, and the circle corresponding to the point with the largest cumulative value in the three-dimensional parameter space is taken as the eye area of the cultured fish, and the center of the circle corresponding to the eye area of the cultured fish is taken as the center point of the whole eye area.

S002: the gray scale change sequence in each direction of the eye area and the first data category, the second data category and the overall gray scale difference of each gray scale change sequence are obtained; according to the first data category, the second data category and the overall gray scale difference of each gray scale change sequence, the fish eye turbidity of the eye area is obtained.

When the cultured fish is stale, the eyes are shriveled, resulting in no water in the fish eyes, and the boundary between the eyeball area and the iris area of the fish eyes is also clear. However, the boundary between the eyeball area and iris area of the fresh cultured fish is also clear, and the boundary between the eyeball area and iris area of the secondary fresh cultured fish is blurred, so secondary fresh cultured fish may be distinguished from the fresh cultured fish and the stale cultured fish according to the difference between the eyeball area and iris area in the eye area of cultured fish. The difference between the stale cultured fish and the fresh cultured fish is that the eye lens of the fresh cultured fish protrudes outward, the eye lens of the stale cultured fish is collapsed and shriveled, and the corneas are wrinkled, while the lens of fish is spherical. When the lens is plump, due to the reflection from the top of the lens, a bright point will be formed near the center of the fish eye, while when the lens is shriveled, the reflection will appear at the top of the wrinkled corneas, so a bright point with a large gray scale value will be formed at the center far away from the fish eye, and there may not be a pixel with a large gray scale value in these positions.

To sum up, the overall gradient change degree of the internal gray scale in the eye area of secondary fresh cultured fish is small; the overall gradient change degree of the internal gray scale in the eye area of the fresh cultured fish is large, and the reflection position is closer to the center position of the fish eye; and the overall gradient change degree of the internal gray scale in the eye area of the stale cultured fish is large, and the reflection position is far from the center position of the fish eye, so the disclosure represents the fish eye turbidity by the overall gradient change degree of the gray scale in the eye area, and represents the fish eye plumpness by the reflection position relative to the center position of the fish eye. The specific process is as follows:

The eyes of the fresh cultured fish are clear and transparent, but the color difference between the iris area and the eyeball area is large, so the fresh cultured fish may first meet the that the internal gray scale difference between the eyeball area and the iris area is small, and the gray scale difference between the two areas is large, and the gray scale in the whole eye area shows a gradient change, so:

a two-dimensional rectangular coordinate system is established with the center position of the eye area as the origin, and the horizontal direction to the right is 0° direction, and every 1° is taken as a direction to obtain the coordinates and gray scale value of the pixel passing in each direction in the eye area, and the pixel and the gray scale value constitute the gray scale change sequence in each direction, so that a total of 360 gray scale change sequences may be obtained in the disclosure. The gray scale change sequence corresponding to the i-th direction is denoted as $I_i$, and the gray scale change sequence is analyzed as an example:

OTSU algorithm is used to obtain the segmentation threshold $\varepsilon_i$ of each gray scale value in $I_i$, and the maximum distance from the pixel corresponding to the gray scale value smaller than the segmentation threshold in $I_i$ to the eye center point is obtained. The pixel corresponding to the maximum distance is the boundary point between the eyeball area and the iris area in the eye area, and the serial number of the pixel in $I_i$ is $m_i$, and the boundary point between the eyeball area and the iris area in the i-th direction is the $m_i$-th data in $I_i$, so the maximum distance is recorded as the boundary distance $d_{imax}$. When the distance $d_{it}$ from the t-th pixel in $I_i$ to the eye center point is less than or equal to $d_{imax}$, the t-th pixel is divided into the first data category, and when $d_{it}$ is greater than $d_{imax}$, the t-th pixel is divided into the second data category. Therefore, the data categories of each pixel in $I_i$ are divided, and the first data category and the second data category of the gray scale change sequence are obtained, the two data categories correspond to the eyeball area and iris area in the fish eye respectively.

The average gray scale value of all the first data categories in the gray scale change sequence $I_i$ corresponding to the i-th direction is recorded as the first mean value $H_{i1}$, and the average gray scale value of all the second data categories is recorded as the second mean value $H_{i2}$. The overall gray scale difference between the first data category and the second data category is recorded as $\Delta H_i$. Similarly, the first mean value, the second mean value and the overall gray scale difference in each direction are obtained. According to the difference between the first mean value, the second mean value and the third mean value in each direction, the fish eye turbidity Z is obtained as follows:

$$Z = \frac{1}{n}\sum_{i=1}^{n}\sum_{j=1}^{2}\exp(-\Delta H_i) \times (H_{ij} - \overline{H}_j)^2$$

where, n represents the number of gray scale change sequences, and n=360 in the disclosure. $H_{ij}$ represents the j-th mean value in the i-th direction in the eye area, and the values of j are 1 and 2, which correspond to the first mean value $H_{i1}$ and the second mean value $H_{i2}$ respectively; $\overline{H}_j$ represents the average value of the corresponding j-th mean value in each direction in the eye area, and exp ( ) is an exponential function with a natural constant as a base number.

Because there is a big gray scale difference between the eyeball area and the iris area, it is necessary to deal with these two areas separately. When the internal gray scale difference between the two areas is large, it means that there is turbidity in the eye area at this time, and the freshness grade of the cultured fish is secondary fresh. According to the disclosure, the internal gray variance of the eyeball area and the iris area is used to represent the internal gray scale difference of the two areas. The greater the internal variance of the two areas is, the greater the probability of the freshness grade of the corresponding cultured fish being the secondary fresh is, otherwise, the freshness grade of the corresponding cultured fish is other grades.

exp (−$\Delta H_1$) represents the reference weight of the internal gray scale difference between the eyeball area and the iris area in the i-th direction, and the corresponding secondary freshness is different due to different turbidity. Therefore, the disclosure obtains the reference weight of the internal gray scale difference in each direction when calculating the fish eye turbidity according to the overall gray scale difference between the eyeball area and the iris area in each direction. The smaller $\Delta H_i$ is, the smaller the difference between the eyeball area and the iris area in this direction is, the higher the turbidity in the corresponding direction is, and the greater the reference weight for the internal gray scale difference in this direction is. The greater $\Delta H_i$ is, the smaller the reference weight for the internal gray scale difference in this direction is.

S003: the fish eye plumpness of the eye area is obtained according to the gray scale value of each pixel in each data category of each gray scale change sequence and the distance between each pixel and the eye center point.

Due to the eyes of the stale cultured fish are shriveled, the color of the blood stasis that may exist in the eye area becomes light, which makes the internal gray scale difference in different areas of the stale cultured fish small, and makes the gray scale difference between different areas large, so the fish eye turbidity of the stale cultured fish product is also low. Therefore, it is still impossible to determine the specific freshness of the cultured fish product only according to the fish eye turbidity in the eye area. The biggest difference between the fresh cultured fish and the stale cultured fish lies in the plumpness of lens. When the lens is spherical, and is plump, a bright point will be formed at the top of the lens. When the lens is shriveled, the cornea is wrinkled, and the wrinkled position leads to uneven brightness change in the eye area. In order to avoid the interference between the color of the eyeball area and the color of the iris area, the relative positions of the reflective points in different areas of the eye are used to represent the fish eye plumpness.

Under normal circumstances, the reflection position of the fish eyes of the fresh cultured fish product may be located at the top of the lens, namely, the center of the eye area, and there will be no bright points in other areas. However, when the cultured fish is stale, the corneas of the fish eyes are wrinkled, which increases the light reflected from the top of the wrinkled position into the camera, and then leads to higher brightness in the wrinkled position. That is to say, when a pixel with a high gray scale value appears at the position farther away from the center of the eye, it means that there is a wrinkled position in the fish eye, and the freshness of the corresponding cultured fish product is lower. Therefore, the disclosure firstly calculates the gray scale difference between the t-th pixel and the average gray scale value of the data category to which the pixel belongs in the i-th direction, and then sets the reference weight of the corresponding pixel according to the relative distance between each pixel and the eye center point, thereby calculating the non-plumpness of each area. At this time, the greater the distance between the t-th pixel and the eye center point is, the greater the reference degree of the gray scale difference corresponding to the pixel is, and at this time the greater the gray scale difference is, the higher the probability of the cornea of the fish eye being wrinkled is, and the smaller the plumpness of the corresponding fish eye is. According to the fish eye plumpness in each direction, the fish eye plumpness G of the whole eye area may be obtained and expressed as follows:

$$G_1 = \sum_{i=1}^{n}\sum_{t=1}^{m_i} \frac{d_{it}}{d_{imax}} \times |h_{it} - H_{i1}|$$

$$G_2 = \sum_{i=1}^{n}\sum_{t=m_i+1}^{N_t} \frac{d_{it} - d_{imax}}{D_{imax} - d_{imax}} \times |h_{it} - H_{i2}|$$

$G = \exp(-(G_{i1} + G_{i2}))$ where $G_1$ is the first non-plumpness obtained according to the first data category in each gray scale change sequence, corresponding to the non-plumpness of the eyeball area; $G_2$ is the second non-plumpness obtained according to the second data category in each gray scale change sequence, corresponding to the non-plumpness of the iris area; $h_{it}$ is the gray scale value of the t-th pixel in the i-th gray scale change sequence, and $d_{it}$ is the Euclidean distance between the t-th pixel in the i-th gray scale change sequence and the eye center point; $m_i$ is the serial number of the boundary point between the eyeball area and the iris area in the i-th gray scale change sequence; $N_i$ is the total number of pixels included in the i-th gray scale change sequence; and $D_{imax}$ is the maximum distance from all pixels to the eye center point in the i-th gray scale sequence.

When t≤$m_i$, it means that the pixel is in the eyeball area at this time, and the data category to which the pixel belongs is the first data category. $|h_{it}-H_{i1}|$ represents the gray scale difference between the t-th pixel in the i-th direction and the first mean value $H_{i1}$ to indicate the probability of the bright point. The greater the gray scale difference is, the higher the gray scale value of the pixel is, and the greater the probability of the corresponding pixel being a bright point is. In the i-th direction, the farthest point from the pixel in the eyeball area to the eye center point is the boundary point between the eyeball area and the iris area, and the farthest distance from the boundary point to the eye center point is $d_{imax}$, so the range of the distance between each pixel in this area and the eye center point is $[0, d_{imax}]$. The closer $$\frac{d_{it}}{d_{imax}}$$

is to 1, the farther the t-th pixel from the eye center point in the eyeball area is, the greater the reference weight of the gray scale difference $|h_{it}-H_{i1}|$ corresponding to this pixel is, and the greater the gray scale difference is at this time, the higher the obtained non-plumpness is; and the farther $$\frac{d_{it}}{d_{imax}}$$

is to 1, the closer the t-th pixel from the eye center point in the eyeball area is, the smaller the reference weight of the gray scale difference $|h_{it}-H_{i1}|$ corresponding to this pixel is, and the smaller the gray scale difference at this time is, the lower the obtained non-plumpness is. Thus, the non-plumpness in the eyeball area, namely, the first non-plumpness, is obtained.

When $m_i < t \leq N$, the pixel is in the iris area at this time, and the pixel belongs to the second data category at this time, so when calculating the gray scale difference, it is necessary to calculate the gray scale value of each pixel and the average gray scale value of the second data category in the i-th direction, that is, to calculate the second mean value, that is, to calculate the gray scale difference $|h_{it}-H_{i2}|$ between the t-th pixel and the second mean value. In this direction, the pixel with the smallest distance between the pixel in the iris area and the eye center point is the boundary point between the eyeball area and the iris area, so the range of the distance between each pixel in this area and the eye center point is $(d_{imax}, D_{imax}]$. At this time, when the closer $$\frac{d_{it} - d_{imax}}{D_{imax} - d_{imax}}$$

is to 1, it means that the t-th pixel is in the iris area. The greater the distance between this pixel and the eye center point at this time is, the greater the reference weight of the gray scale difference $|h_{it}-H_{i2}|$ corresponding to this pixel is, and the greater the gray scale difference at this time is, the higher the obtained non-plumpness is, and the smaller the distance between this pixel and the eye center point at this time is, the smaller the reference weight of the gray scale difference $|h_{it}-H_{i2}|$ corresponding to this pixel is, and the smaller the gray scale difference at this time is, the lower the obtained non-plumpness is. Thus, the non-plumpness of the iris area, that is, the second non-plumpness, is obtained.

S004: the freshness of the cultured fish product is obtained according to the fish eye turbidity and the fish eye plumpness in the eye area.

Fresh cultured fish has low fish eye turbidity and high fish eye plumpness. The fish eye turbidity of the secondary fresh cultured fish increases, but the fish eye plumpness decreases; The fish eye turbidity of the stale cultured fish may be low, and the fish eye plumpness is low. The difference between the fresh cultured fish product and the stale cultured fish product may be small, so it is impossible to distinguish the fresh and stale cultured fish directly according to the fish eye turbidity, but there is a big difference in the fish eye plumpness between the fresh and stale cultured fish. Therefore, when judging the freshness of the cultured fish product, a preliminary judgment may be performed according to the fish eye plumpness, so as to preliminarily distinguish the fresh and secondary fresh cultured fish product from the stale cultured fish product, and then distinguish the secondary fresh and the fresh cultured fish product according to the fish eye turbidity, so the freshness X of the cultured fish product may be expressed as:

$$X = \exp(-Z) lg(\delta \times G)$$

where, $\delta$ is a super parameter, and the value may be set by the manufacturer according to the production requirements, $\delta=2$ is set in the present disclosure; lg( ) is a logarithmic function with 10 as a base.

The freshness is directly proportional to the fish eye plumpness and inversely proportional to the fish eye turbidity, so the disclosure uses exp (−x) to construct the negative correlation between the fish eye turbidity and the freshness, and uses lg (x) to construct the positive correlation between the freshness and the fish eye plumpness.

When the fish eye plumpness $G < 1/\delta$, it means that the greater the probability of the cultured fish product being stale is, at this time $lg(\delta \times G) < 0$, the corresponding freshness $X < 0$, and the lower the fish eye plumpness is, the higher the fish eye turbidity is and the smaller X is. That is, when the freshness is less than 0, it is considered that the currently detected cultured fish product is stale, and the smaller the value is, the greater the staleness is.

When $G \geq 1/\delta$, $lg(\delta \times G) > 0$, it is considered that the cultured fish product is fresh at this time, and the greater the plumpness is, the lower the fish eye turbidity is, and the higher the freshness of the corresponding cultured fish product is.

So far, the cultured fish products with different freshness grades have been divided, and the specific freshness of cultured fish products with the same freshness grade may be further distinguished, thus obtaining more accurate freshness of the cultured fish products.

In the disclosure, firstly, the image of the fish head area of each cultured fish product is collected, so as to extract the eye area of each cultured fish product. Then, the gray scale change sequence in each direction in the eye area is obtained, and the data categories are divided according to the gray scale value of each pixel in each gray scale change sequence, so as to obtain the eyeball area and the iris area; according to the gray scale difference between the two areas and the overall gray scale difference between the two areas, the fish eye turbidity of each eye area is obtained to distinguish secondary fresh cultured fish product from fresh and stale cultured fish product. Then, according to the distance between each pixel in each eye area and the eye center point, and the difference between the gray scale value of each pixel relative to the average gray scale value of the data category to which the pixel belongs, the fish eye plumpness in the eye area is obtained, so as to further distinguish the fresh cultured fish product from the stale cultured fish product. According to the different characteristics of the cultured fish products with different freshness, the cultured fish products with different freshness grades are distinguished, and the freshness of the cultured fish products with the same freshness grade is further distinguished, so that the accuracy of judging the freshness of the cultured fish products is improved, which is simple and rapid.

The above is only the preferred embodiment of the disclosure, and it is not used to limit the disclosure. Any change or replacement obvious to those skilled in the art within the technical scope disclosed in this disclosure should be included in the protection scope of this disclosure. Therefore, the protection scope of this disclosure should be defined by the protection scope of the claims.

What is claimed is:

1. A method for judging freshness of cultured fish product based on eye image recognition, comprising following steps:
    obtaining an eye area and an eye center point of the cultured fish product according to a fish head area of the cultured fish product;
    obtaining each gray scale change sequence of the eye area according to coordinates of each pixel in each direction of the eye area and a gray scale value of the each pixel;
    obtaining a first data category and a second data category of the each gray scale change sequence according to the gray scale value of the each pixel in the each gray scale change sequence; recording an average gray scale value of the each pixel in the first data category as a first mean value, and recording an average gray scale value of the each pixel in the second data category as a second mean value; taking a difference value between the second mean value and the first mean value of the each gray scale change sequence as an overall gray scale difference of the each gray scale change sequence; obtaining a fish eye turbidity of the eye area according to the first data category, the second data category and the overall gray scale difference of the each gray scale change sequence; and
    obtaining a gray scale difference of the each pixel in the first data category according to the gray scale value of the each pixel and the first mean value in the first data category of the each gray scale change sequence; obtaining a first non-plumpness of the eye area according to a distance from the each pixel in the first data category to the eye center point and the gray scale difference of the each pixel; obtaining a second non-plumpness of the eye area according to the second data category of the each gray scale change sequence; obtaining a fish eye plumpness of the eye area according to the first non-plumpness and the second non-plumpness of the eye area; and
    obtaining the freshness of the cultured fish product according to the fish eye turbidity and the fish eye plumpness in the eye area;
    wherein, a method for obtaining the first data category and the second data category of the each gray scale change sequence is:
    obtaining a segmentation threshold of the each gray scale change sequence, and recording a maximum distance from the each pixel with the gray scale value smaller than the segmentation threshold in the each gray scale change sequence to the eye center point as a boundary distance; dividing the pixel with a distance from the eye center point less than or equal to the boundary distance in the each gray scale change sequence into the first data category; dividing the pixel with the distance from the eye center point greater than the boundary distance into the second data category; and sequentially processing the each pixel in the each gray scale change sequence to obtain the first data category and the second data category of the each gray scale change sequence.

2. The method for judging freshness of cultured fish product based on eye image recognition according to claim 1, wherein a method for obtaining the fish eye turbidity in the eye area is:

$$Z = \frac{1}{n}\sum_{i=1}^{n}\sum_{j=1}^{2}\exp(-\Delta H_i)\times(H_{ij}-\overline{H}_j)^2$$

wherein Z is the fish eye turbidity in the eye area; n represents a number of the gray scale change sequences in the eye area; $H_{ij}$ represents a j-th mean value in an i-th direction in the eye area; $\overline{H}_j$ represents an average value of the j-th mean value corresponding in the each direction in the eye area, and exp ( ) is an exponential function with a natural constant as a base number, wherein the overall gray scale difference between the first data category and the second data category is recorded as $\Delta H_i$, and wherein exp $(-\Delta H_1)$ represents a reference weight of the internal gray scale difference between eyeball area and iris area in the i-th direction.

3. The method for judging freshness of cultured fish product based on eye image recognition according to claim 1, wherein a method for obtaining the gray scale difference of the each pixel in the first data category is:
    taking an absolute value of a difference value between the gray scale value of the each pixel in the first data category of the each gray scale change sequence and the first mean value of the each gray scale change sequence as the gray scale difference of the each pixel in the first data category.

4. The method for judging freshness of cultured fish product based on eye image recognition according to claim 1, wherein a method for obtaining the first non-plumpness of the eye area is:
    taking a ratio between the distance from the each pixel in the first data category to the eye center point of the each gray scale change sequence and the boundary distance of the each gray scale change sequence as a reference weight of the each pixel; weighting and summing the gray scale difference of the each pixel in the first data category, and taking an obtained result as the first non-plumpness of the each gray scale change sequence; and taking a cumulative sum of the first non-plumpness of the each gray scale change sequence in the eye area as the first non-plumpness in the eye area.

5. The method for judging freshness of cultured fish product based on eye image recognition according to claim 1, wherein a method for obtaining the freshness of the cultured fish product is:

$X=\exp(-Z)lg(\delta \times G)$ wherein, X is the freshness of the cultured fish product, $\delta$ is a super parameter, Z is the fish eye turbidity in the eye area of the cultured fish product, G is the fish eye plumpness in the eye area of the cultured fish product; and lg( ) is a logarithmic function with 10 as a base.

* * * * *